(12) United States Patent
Raue

(10) Patent No.: US 6,854,555 B2
(45) Date of Patent: Feb. 15, 2005

(54) SINGLE WHEEL DRIVING MECHANISM

(75) Inventor: Josef Raue, Dülmen (DE)

(73) Assignee: Kordel Antriebstechnik GmbH, Dulmen (DE)

( * ) Notice: Subject to any disclaimer, the term of this patent is extended or adjusted under 35 U.S.C. 154(b) by 0 days.

(21) Appl. No.: 10/186,804

(22) Filed: Jul. 1, 2002

(65) Prior Publication Data

US 2003/0006084 A1 Jan. 9, 2003

(30) Foreign Application Priority Data

Jul. 6, 2001 (DE) .......................................... 101 32 318

(51) Int. Cl.$^7$ ............................................. B60K 17/00
(52) U.S. Cl. ........................ 180/337; 180/343; 180/374; 180/383; 180/13
(58) Field of Search ................................ 180/337, 342, 180/343, 374, 383, 385, 11, 12, 13

(56) References Cited

U.S. PATENT DOCUMENTS 3,662,849 A   5/1972   Bostad et al.
5,558,174 A   9/1996   Avitan et al.

FOREIGN PATENT DOCUMENTS

| DE | 935 201    | 8/1963  |
| DE | 30 28 276  | 5/1981  |
| DE | 31 33 027  | 3/1983  |
| DE | 36 41 022  | 4/1988  |
| DE | 196 33 071 | 8/1996  |
| DE | 196 33 316 | 2/1998  |
| GB | 198 26 067 | 12/1999 |

Primary Examiner—Michael J. Oarone
Assistant Examiner—Gabriel S. Sukman
(74) Attorney, Agent, or Firm—Collard & Roe, P.C.

(57) ABSTRACT

A single-wheel driving mechanism for floor transport vehicles is comprised of a gearing housing with at least one gear stage, a flanged-on drive motor, and a driven running wheel. For obtaining the smallest possible installation space or achieving a simplified installation or removal of the single-wheel driving mechanism, in conjunction with high transmission of force at the same time, the running wheel is directly connected with torsional strength with a gear of the transmission, and the gear of the transmission is rotatably supported on a support element.

25 Claims, 3 Drawing Sheets

SINGLE WHEEL DRIVING MECHANISM

BACKGROUND OF THE INVENTION

1. Field of the Invention

The invention relates to a single-wheel driving mechanism, in particular for single-wheel floor transport vehicles, which is comprised of a gearing housing with at least one gear stage, a flanged-on drive motor and a driven running wheel.

2. The Prior Art single-wheel driving mechanisms of the type specified above are preferably employed for floor conveyor vehicles. It is important in connection with such mechanisms that they have small and narrow dimensions, and that the risk for the vehicle of tilting over is reduced by keeping the center of gravity of the vehicle as low as possible. The installation space has to be kept small, so that the possibilities for maneuvering the vehicle are enhanced. Not to be disregarded in this connection is the fact that the driving forces and loads, which range from 1 to 3 tons, that have to be transmitted to one single running wheel via the single-wheel driving mechanism, are quite high, and that to that extent, the housing and the required gear stage consequently have to be designed for such loads.

A single-wheel driving system is known, for example from German Patent No. DE-PS 31 33 027, in connection with which a pinion of a spur gear drive is arranged on the shaft of the electric motor in connection with a two-stage type of gearing. This, however, causes the pitch circle to be relatively large due to the material thickness required between the foot of the tooth and the receiving bore, which means that the reducing gear ratio is consequently limited. Furthermore, such a constructional measure requires high manufacturing expenditure. The downwardly-extending support for the shaft of the spur gear and the bevel-gear pinion is disposed at the level of the rim and tire of the running wheel, which means that it is not possible to keep the spacing of the shaft from the center of the gearing axis as small as desirable for obtaining a particularly small turning radius.

Furthermore, known designs of single-wheel drive mechanisms have the disadvantage that their installation and removal require increased labor expenditure in particular for later maintenance and service purposes, and that the construction of the housing has to satisfy increased requirements.

SUMMARY OF THE INVENTION

It is therefore an object of the invention to provide a single-wheel driving mechanism that has the smallest possible installation space and permits simplified installation and removal while high forces are transmitted at the same time.

For solving this problem, the running wheel is directly connected with a gear with torsional strength, and the gear is supported in a rotating manner on a support element that is coaxially disposed on the inside and stationary. Due to the fact that the running wheel is directly connected with a gear with torsional strength and mounted on a support element, the number of structural components used can be substantially reduced. This results in cost savings and permits a substantial simplification of the construction. When the gear is rotatably supported on a pivot of the housing, or on a journal of the shaft that is mounted with torsional strength and received in a passage (or breakthrough) in the housing, it is possible to dispense with a flanged shaft with bearing elements, and to use a single-component housing without any cover and screw connections due to the simplified of construction. Such a design comprises an extremely narrow type of construction.

Furthermore, such an embodiment comprises a larger bevel gear combined with the same structural size of the gearing, and therefore leads to a reinforcement of the gearing. Admitting the force directly into the running wheel via the bevel gear is particularly advantageous as well. The shaft journal, which is received in a passage of the housing, may be preferably used when higher loads are involved. Furthermore, the shaft journal, which is not rotating, reinforces the housing in the lower areas in a beneficial manner, whereby the occurring forces are immediately introduced into the housing via the shaft journal. In this connection, the bevel gear located on the driven side may comprise a pot-shaped attachment extending in the direction of the running wheel. Such an attachment is molded on, forming one piece with the bevel gear, so that it is directly connected with the running wheel, and the largest possible support area can be formed versus the pivot of the housing or shaft journal.

The transmission system is designed in the form of a two-stage gearing, and a first gear stage, which has the tooth system of a spur wheel, is associated with the drive motor, whereas a second gear stage having the tooth system of a bevel gear, is associated with the running wheel. The two gear stages are connected by a driving shaft that is supported in the housing. The running wheel is connected with torsional strength with the bevel gear on the driven side; and the rim of the running wheel and/or the bevel gear are supported versus the pivot of the housing or the shaft journal via bearing elements. In the embodiment of the single-wheel driving mechanism as defined by the invention, the running wheel, together with the bevel gear on the driven side, is directly supported on a component of the housing, specifically on a housing pivot or shaft journal. Suitable bearing elements such as, for example antifriction bearings are used in this connection. The driving shaft, which is supported in the housing, connects the first gear stage consisting of the spur gear tooth system with the bevel gear stage for driving the running wheel, within the proximity of the driving motor. Due to the housing pivot or shaft journal, no minimum thickness of the wall of the housing is required for the arising forces because such forces can be directly transmitted to the running wheel. Furthermore, due to the special way in which the running wheel is secured, it is possible to design the body of the wheel in a variable manner, and it is in particular possible to continue to use existing wheel bodies in the present novel construction.

Viewed overall, it is thus possible to obtain a reinforcement of the transmission system by the novel construction with no change or reduction in the structural size. Such a system, moreover, requires fewer structural components and thus leads to a reduction of the labor expenditure for the installation or removal of the driving system.

In such an embodiment of the invention, the support element is arranged axially in relation to the running wheel and is connected with the housing, for example screwed to the latter or designed in a way so as to form one single piece with the housing. Or, in the case of the shaft journal, the support element is pressed into a passage (or breakthrough), whereby the support element is designed for receiving two antifriction bearings, on which the bevel gear and, if necessary, the rim of the running wheel can be supported.

Taking into account the dimensions and loads specified for a single-wheel driving mechanism with the smallest possible installation space and an optimal tooth system and support ratio, it is possible to manufacture the driving mechanism at favorable cost by virtue of the novel construction as defined by the invention.

A further advantage consists in that the smallest possible radius of pivot around the vertical axis of the single-wheel driving mechanism is achieved especially in connection with running wheels that offer no space for accommodating any other support for the driving shaft because of their relatively small outside diameters between the hub and the rim of the running wheel. Due to the fact that its two bearings each are arranged outside of the tooth system as a result of the relatively large spacing between the two bearings, in particular the support of the driving shaft is realized in this connection in a particularly favorable manner. Adjusting a good support profile and favorable clearance (or play) of the bearing of the bevel gear drive, which has a tooth system in the form of a spiral or circular arc, is simplified because both the spur wheel and the bevel gear pinion can be mounted on the driving shaft in a fixed manner. For the required adjustment of the axial position of the tooth system of the bevel gear pinion and bevel gear, it is necessary to associate shims with the bearing in a simple manner, whereby the spur gear may be connected with the driving shaft by means of a pressed fit.

In a special embodiment of the invention, a pump device is integrated in the pivot of the housing or shaft journal, the latter being provided with torsional strength. Such a pump device is comprised of an axially movable tappet and a pressure chamber with an inlet valve and an outlet valve. With the help of the integrated pump device, it is possible to pump transmission oil from the lower interior space of the housing upwards to the lubrication system for the upper bearing elements. The special advantage offered by such a system is that the housing of the gearing does not have to be completely filled with oil, so that, for example no excessive slip can develop, and the degree of efficiency of the transmission is thus enhanced. At the same time, the pump device assures that the upper elements of the gearing and also the bearing elements can be adequately lubricated. The tappet is disposed in this connection with one end in a groove with a wavelike deepening that is formed in the pot-shaped attachment of the bevel gear, whereby the tappet is pressed into the groove in a spring-loaded manner and put into an axial movement that results from the rotational motion. The opposite side of the tappet is sealed off against a pressure chamber and is used as a piston (or plunger) that is capable of pumping the oil present upwards via an inlet valve and an outlet valve.

For this purpose, a bore formed to serve as an oil channel is provided in the driving shaft. This bore feeds into the pressure chamber via the outlet valve, whereas the inlet valve is connected with the lower interior of the gearing. The bore ends above the driving shaft at a level assuring adequate lubrication of the upper bearing elements.

The stump of the driven shaft of the electric motor may be provided with a pinion tooth system or a pinion and drives the spur wheel of the high-speed shaft of the electric motor with a lower number of teeth. This provides the reduction ratio of the spur wheel drive with an optimal value, so that taking into account the total reduction of this two-stage single-wheel driving mechanism, the reduction ratio of the bevel gear drive needs to be selected only adequately small that a number of teeth greater than the limit number of teeth can be provided for the tooth system of the bevel gear pinion. In this way, a more robust design is obtained in view of the high torque, as compared to driving mechanisms of this type equipped with spur gear pinions with a higher number of teeth.

The torque is thus transmitted with a pinion tooth system from the drive motor to the spur wheel. The spur wheel is connected with torsional strength with a driving shaft, whereby the driving shaft drives the bevel gear, the latter being connected with the running wheel, via a tooth system of the bevel pinion.

The housing is preferably designed in the form of one single component and comprises a first opening leading to the drive motor, and a second opening leading to the running wheel. These openings of the housing facilitate the installation and removal of the single-wheel driving mechanism. The first opening is closed after the installation by means of a screw connection with the inside ring of the bearing of the rotating ring, and the second opening is closed by the bevel gear and a clipped-in covering flap. Two sealing means are employed in this connection between the non-rotating and rotating elements, which limit the enclosed volume and prevent the transmission oil from leaking out.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
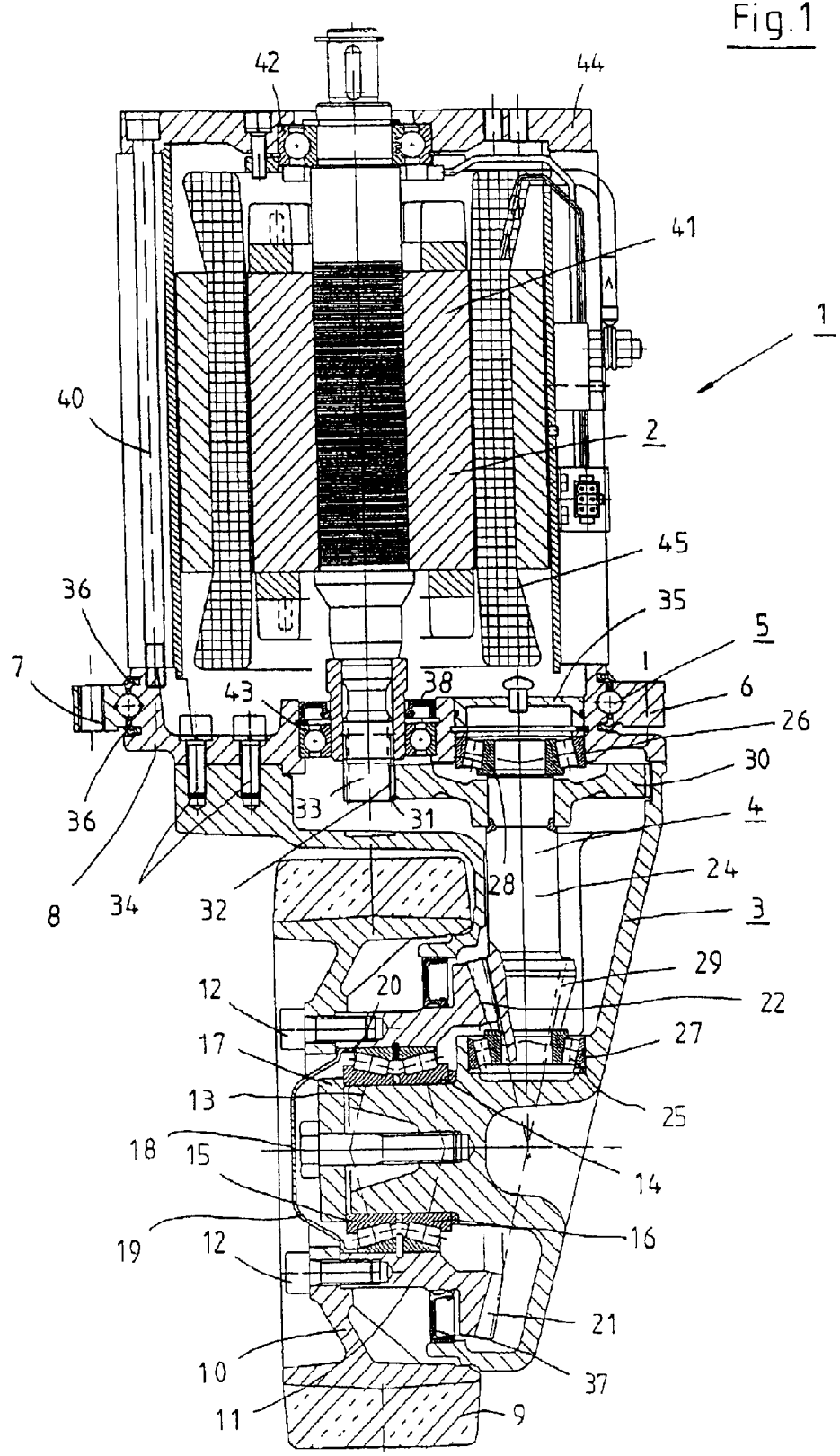
FIG. 1 is a cut side view of a single-wheel driving mechanism as defined by the invention, comprising a pivot of the housing.

Referring now in detail to the drawings, FIG. 1 shows a cut side view of a single-wheel driving mechanism 1 comprised of a drive motor 2, a housing 3 with a two-stage gearing 4, and a rotating rim bearing 5 for supporting the housing 3 in a pivoting manner.

Outer ring 6 of bearing 5 of the rotating rim is provided for the purpose of mounting the single-wheel driving mechanism 1 in a vehicle, whereby a plurality of the threaded bores 7 distributed over the circumference may be used for the screw connections. Inner ring 8 of the bearing of the rotating rim bearing receives a vertically mounted drive motor 2 and housing 3, which is located underneath drive motor 2. Thus drive motor 2, together with housing 3, can be swiveled vis-à-vis the floor transport vehicle to be driven. For driving the floor transport vehicle, provision is made for a running wheel 9, which is mounted by pressing it onto a rim 10 of the running wheel. Running wheel 9 may consist of, for example a solid rubber or plastic wheel. According to the invention, rim 10 of the running wheel is screwed to the gear stage with a bevel gear 11 on the driven side by means of a plurality of the screw bolts 12, which are distributed over the circumference. Rim 10 of the running wheel and bevel gear 11 rest on a pivot 13 of housing 3, said pivot being shaped by molding on housing 3, forming one piece with housing 3. On its outer surface 14, pivot 13 of housing 3 comprises two antifriction bearings 15 and 16, which are directed against one another and supported by a contact pressure-exerting disk 17. Contact pressure-applying disk 17 is screwed to pivot 13 of housing 3 by means of a screw bolt 18. The antifriction bearings 15 and 16, as well as screw bolt 18 are protected against soiling by a clamped-in (or clipped-in) cover cap 19. Cover cap 19 closes opening 20 of housing 3.

With its bevel gear tooth system 21, bevel gear 11 mates with bevel pinion tooth system 22 of a bevel pinion 29 of driving shaft 24. Driving shaft 24 is arranged with lateral offset versus drive motor 2 and supported vis-à-vis housing 3 by the upper and the lower antifriction bearings 25, 26. Antifriction bearings 25 and 26 each are mounted at the end side on driving shaft 24 and rest in the recesses 27 and 28, respectively, of the housing 3. The lower gear stage is formed by bevel gear 11 and a bevel pinion 29 secured on driving shaft 24. Alternatively, it is possible to provide driving shaft 24 with a bevel tooth system.

The second gear stage is formed by a spur gear 30 with a spur gear tooth system 31 and a pinion tooth system 32 of electric motor shaft 33. Electric motor shaft 33 protrudes beyond rotating rim bearing 5 into gear housing 3, so that pinion tooth system 32 leads to engagement with spur gear tooth system 31 of spur gear 30. Housing 3 is screwed to inner ring 8 of the rotating rim bearing via a plurality of the screw bolts 34, which are distributed over the circumference. Recess 28 for receiving the upper antifriction bearing 26 of driving shaft 24 is closed by a sealed closing cap 35. Inner ring 8 of the bearing of the rotating rim thus closes the upper opening of the housing 3 with the drive motor 2, which is arranged vertically in relation to the transmission 4. For avoiding soiling, outer ring 6 of the bearing of the rotating rim and inner ring 8 of the bearing of the rotating rim are sealed by seals 36. Transmission 4 is sealed against dirt or oil loss by sealing elements 37 and 38.

Drive motor 2 is mounted vertically on bearing 5 of the rotating rim and is screwed to inner ring 8 of the rotating rim by a plurality of screw bolts 40, which are distributed over the circumference. Electric motor shaft 33 with armature winding 41 is supported versus housing 44 via a lower and an upper antifriction bearing 42 and, respectively, 43, and against inner ring 8 of the bearing of the rotating rim on the other hand. The motor winding 45 is secured in housing 44. The end of electric motor shaft 33 disposed opposite pinion tooth system 32 is extending from motor housing 44 and connects a steering fork.

The single-wheel driving mechanism is driven via drive motor 2, to which voltage can be admitted, via pinion tooth system 32 of driving shaft 33. The drive is acting directly on spur gear 30, which is connected with driving shaft 24 with torsional strength and transmits the torque to bevel pinion 29, and from the latter via tooth system 21, 22 to bevel gear 11, which is connected with torsional strength with rim 10 of the running wheel, or the running wheel 9. The pivotal movement of steering drive mechanism 1 is assured by bearing 5 of the rotating rim and may take place via the steering fork (not shown). As compared to the known prior art, the embodiment of the single-wheel driving mechanism as defined by the invention requires no running wheel shaft, which results in a saving of costs, and facilitates the installation or removal of the driving mechanism. Furthermore, the construction is characterized by a relatively simple structure of the housing 3 and, owing to the direct coupling provided between running wheel 9 and bevel gear 11, leads to a particularly advantageous transmission of the torque to running wheel 9. In addition, arranging antifriction bearings 25 and 26 for driving shaft 24 outside of spur gear 30 and the bevel pinion 29 provides the possibility for permitting a particularly favorable small amount of play between the wall of the transmission and the driven running wheel. Furthermore, owing to the inventive embodiment, it is possible to have the smallest possible spacing between driving shaft 24 and electric motor shaft 33 in the presence of the same or superior transmission of the torque.

Figure 2:
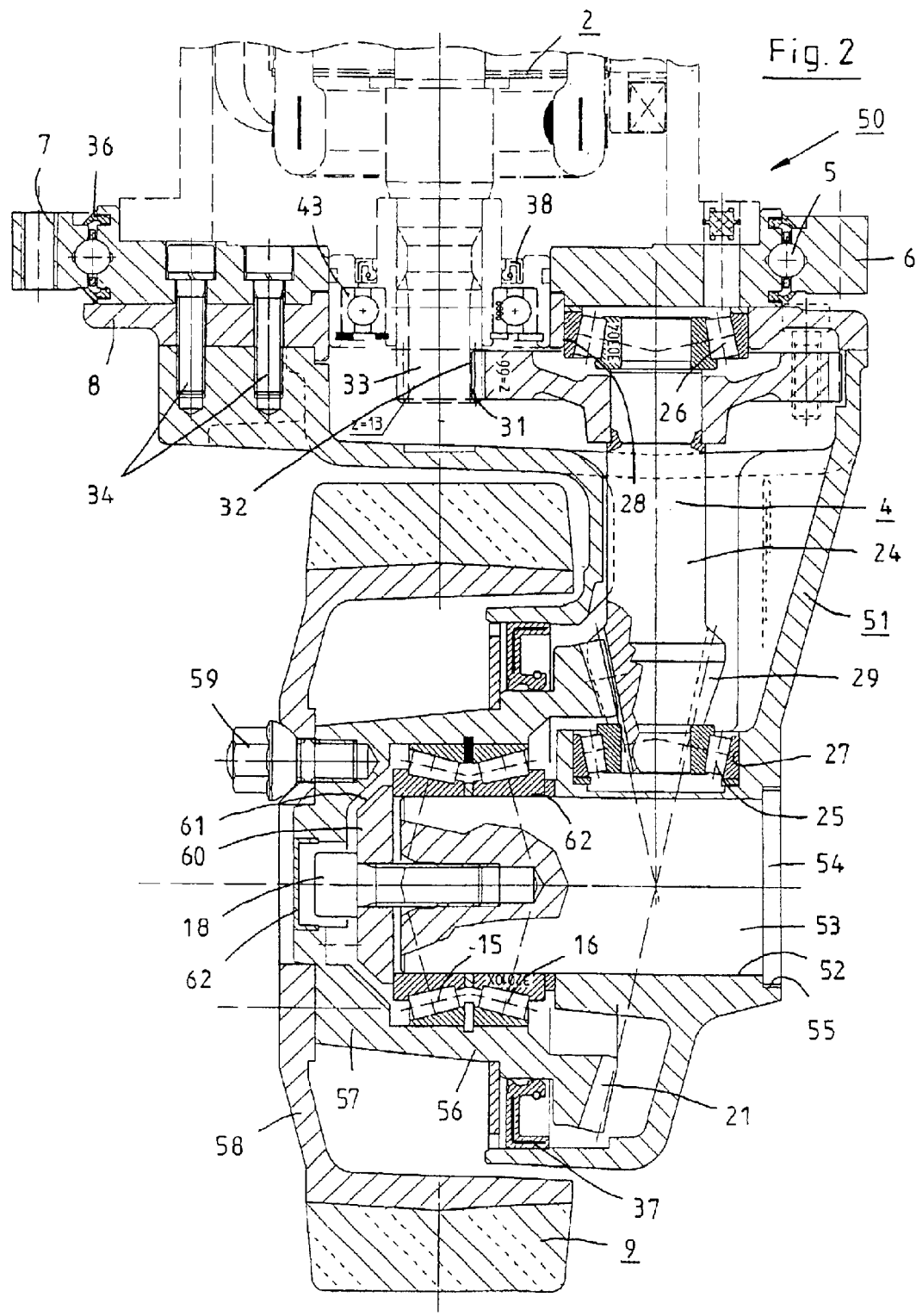
FIG. 2 is a cut side view of a single-wheel driving mechanism as defined by the invention, with a pressed-in shaft journal.

FIG. 2 shows a cut side view of another embodiment of a single-wheel driving mechanism 50 comprised of a drive motor 2, a housing 51 with a two-stage gearing 4, and a rotating rim bearing 5 for pivotably supporting housing 51.

The structure of single-wheel driving mechanism 50 corresponds almost completely with the embodiment according to FIG. 1. Only the housing 51 is different from the housing shown in FIG. 1 on account of its shape. Instead of a pivot of the housing, the lower area of the housing 51 comprises a passage (or breakthrough) 52, which is provided for receiving a shaft journal 53. This shaft journal 53 is pressed into passage 52 in such a way that it is received in housing 51 with torsional strength. In the exemplified embodiment shown, shaft journal 53 is provided with a flange-shaped collar 54 that comes to rest in a recess 55 of housing 51. The shaft journal 53 penetrates the entire lower part of housing 51 and, furthermore, serves for receiving the antifriction bearings 15, 16 in the manner shown already from FIG. 1. Said bearings, furthermore, receive a bevel gear 56 in a supporting manner. As compared to the known design, bevel gear 56 has a pot-shaped attachment 57 pointing in the direction of running wheel 9. Running wheel 9 with its rim 58, which deviates in a minor way from the earlier form as well, is secured on said attachment by screw bolts 59. A contact pressure-exerting disk 60 fixes antifriction bearings 15 and 16. Disk 60 has a chamfer 61 and is directly screwed to shaft journal 53 by means of screw bolt 18. Because the contact pressure-exerting disk 60 has a diameter that is dimensioned slightly larger than the one of shaft journal 53, antifriction bearings 15, 16 are fixed in their positions on outer surface 62 of the shaft journal 53. A covering cap 62 again closes a passage bore extending through to screw bolt 18, 50 that no dirt can penetrate antifriction bearing 15, 16. By realizing a housing 51 with a shaft journal 53 pressed into a passage (or breakthrough) 52, housing 51 is additionally reinforced in the lower area and, furthermore, the manufacture of housing 51 is facilitated in terms of casting technology. In all other respects, the single-wheel driving mechanism 50 offers the same technical advantages as the embodiment shown in FIG. 1.

Figure 3:
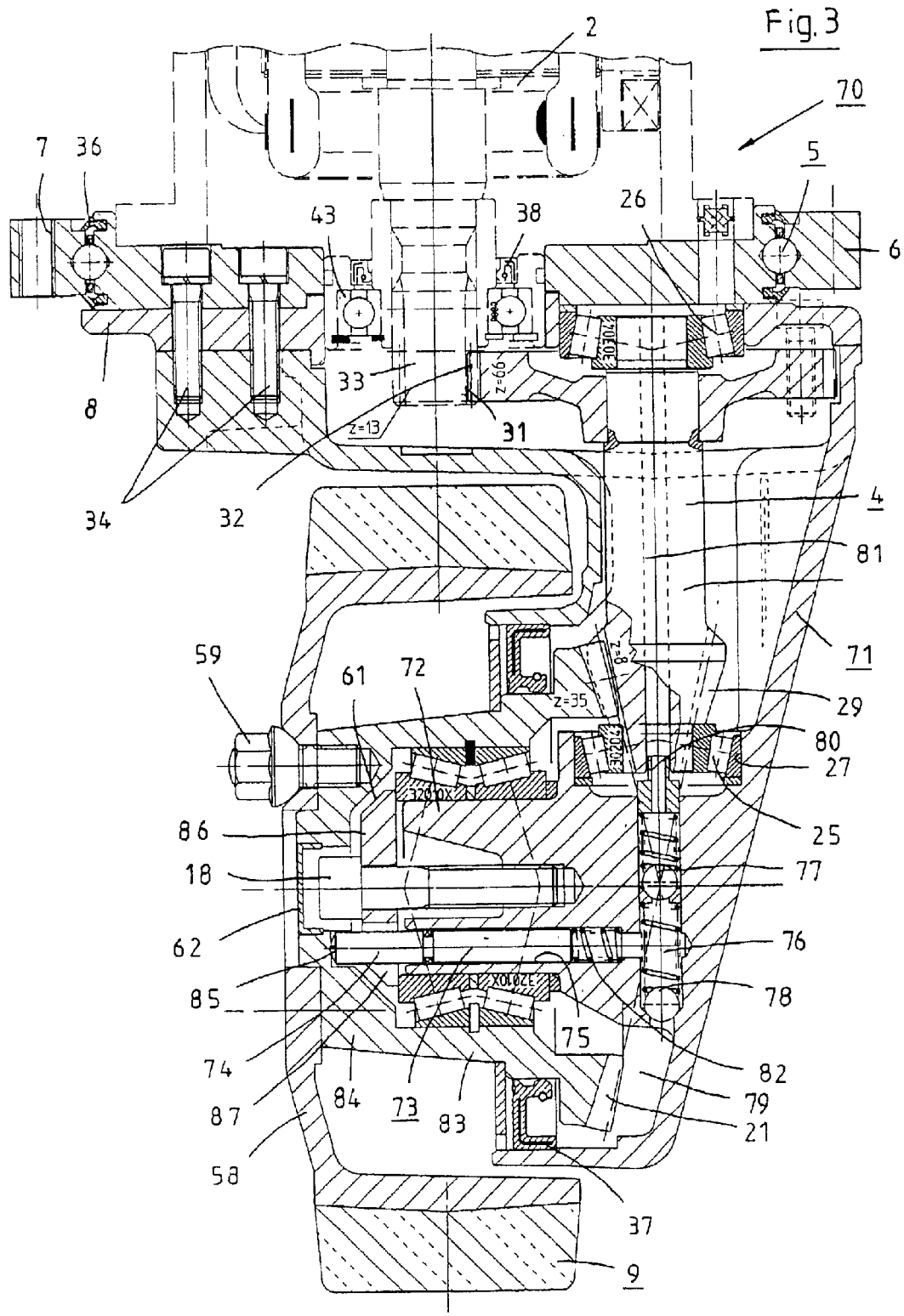
FIG. 3 is a cut side view of a single-wheel driving mechanism as defined by the invention, comprising a pivot of the housing and an integrated pump device.

FIG. 3 shows a further sectional side view of a single-wheel driving mechanism 70 that is also comprised of a drive motor 2, a housing 71 with a two-stage gearing 4, and a rotating rim bearing 5 for pivotably supporting housing 71. The construction of the single-wheel driving mechanism 70 is approximately identical with the one of single-wheel driving mechanisms 1 and 50 according to FIGS. 1 and 2, respectively. However, deviations ensue on account of the fact that a pump device 73 is additionally received in a pivot 72 of the housing. Pump device 73 is comprised of a tappet 74, which is supported in an axially movable manner in a bore 75 of pivot 72 of the housing. Tappet 74 is acting on a pressure chamber 76, which is connected with an outlet valve 77 and an inlet valve 78. Inlet valve 78 feeds into a lower interior space 79 of the housing, which, as a rule, is completely filled with oil. Outlet valve 77, on the other hand, is connected via a connection channel 80 with a bore 81 centrally extending in driving shaft 24. Bore 81 is extending up to above the antifriction bearing 26 provided for supporting the driving shaft 24. Due to the action of the pump, the oil is therefore pumped from interior space 79 of the housing and via inlet valve 78 and outlet valve 77 located within the bore 81, up to antifriction bearing 26, from where it supplies both the driving shaft 24 and the other components of the gearing with an adequate amount of oil.

In the embodiment shown, tappet 74 is pressed by a spring 82 against a pot-shaped attachment 84 of bevel gear 83, and rests in a groove 85 that is arranged in the form of a ring around screw bolt 18, and comprises a wavelike deepening, so that when running wheel 9 is rotating, tappet 74 is put into an axial motion against the spring force of the spring 82. The opposite end of tappet 74 is sealed off against pressure chamber 76 to the extent that it possible to obtain a suction and pressure effect. So that tappet 74 is capable of engaging the groove 85, the contact pressure-exerting disk 86 has a passage (or breakthrough) 87.

Accordingly, while only a few embodiments of the present invention have been shown and described, it is obvious that many changes and modifications may be made thereunto without departing from the spirit and scope of the invention.

What is claimed is:

1. A single-wheel driving mechanism, for floor transport vehicles, comprising:
   a gearing housing with at least one gear stage;
   a flanged-on drive motor connected to the housing;
   at least one stationary support element in the form of a pivot disposed in said gearing housing;
   at least one transmission gear disposed in said gearing housing (3) forming said at least one gear stage;
   a driven running wheel directly connected with torsional strength to said transmission gear, said transmission gear being rotatably supported on said stationary support element coaxially disposed on an inner side of said housing and being driven by said flanged on drive motor.

2. The single-wheel driving mechanism according to claim 1, wherein said support element comprises a non-rotating shaft journal (53) received in a passage (52) of said housing.

3. The single-wheel driving mechanism according to claim 1, further comprising a plurality of bearing elements wherein said transmission pear is a bevel gear, wherein said running wheel has a rim, and wherein said running wheel is connected with torsional strength with said bevel gear located on a driven side, and wherein said rim of the said running wheel is supported versus said pivot via said bearing elements.

4. The single-wheel driving mechanism according to claim 1, further comprising a drive shaft, wherein there are two gear stages, wherein a first of the two gear stages is formed from a spur gear which is driven by said drive motor and coupled to said drive shaft, whereas a second of the two gear stages is associated with said bevel gear which is associated with said running wheel and wherein the two gear stages are coupled together by said drive shaft supported in said gearing housing.

5. The single-wheel driving mechanism according to claim 3, wherein said pivot is arranged axially in relation to said running wheel (9), said pivot being connected with said gearing housing (3) via screw connections.

6. The single-wheel driving mechanism according to claim 5, further comprising at least one antifriction bearing coupled to said pivot of said housing (15, 16), on which said rim (10) of said running wheel and said bevel gear are supported; and wherein said bevel gear further comprises a pot-shaped attachment (57, 84) molded onto and forming one piece with said bevel gear, and extending in a direction of said running wheel.

7. The single-wheel driving mechanism according to claim 6, further comprising a pump device integrated in said pivot of said housing, said pump device comprising an axially movable tappet and a pressure chamber comprising an inlet valve and an outlet valve.

8. The single-wheel driving mechanism according claim 7, further comprising a contact pressure-exerting disk and a spring wherein said tappet extends through said contact pressure-exerting disk and engages a groove of said pot-shaped attachment of said bevel gear, wherein said tappet is pressed into said groove by said spring and said groove is arranged in the form of a ring and comprises a wavelike deepening.

9. The single-wheel driving mechanism according to claim 7, further comprising a driving shaft having a bore serving as an oil channel, said bore feeding via said outlet valve into said pressure chamber, whereas said inlet valve is connected with a lower interior space of the gearing.

10. The single-wheel driving mechanism according to claim 9, further comprising a spur gear, and a bevel pinion disposed in said housing wherein said driving shaft is supported below said spur gear and above said bevel pinion.

11. The single-wheel driving mechanism according to claim 10, wherein said spur gear and said bevel gear pinion are connected with said driving shaft by a pressed fit, and wherein said driving shaft has a bore serving as an oil channel.

12. The single-wheel driving mechanism according to claim 1, further comprising a driven shaft coupled to said drive motor, said driven shaft having a stump, said stump having a driving pinion.

13. The single-wheel driving mechanism according to claim 12, further comprising a pinion tooth system, coupled to said stump of said driven shaft, wherein torque is transmitted by said pinion tooth system from said drive motor to said driving shaft having said spur gear, wherein said driving shaft drives said bevel pinion and said bevel gear which is connected with said running wheel to turn said running wheel.

14. The single-wheel driving mechanism according to claim 1, wherein said housing is formed as one single piece, having two openings with a first opening being directed at said drive motor and a second opening being directed at said running wheel.

15. The single-wheel driving mechanism according to claim 14, further comprising an inner ring of a rotating rim bearing having a screw connection; a covering cap that can be clamped in; and a sealing means;
   wherein said first opening is closed by said screw connection with said inner ring of said rotating rim bearing, and said second opening is closed by said bevel gear and said covering cap that can be clamped in to said bevel gear, and wherein said sealing means is arranged between said pivot which is non-rotating and said bevel gear and said wheel which are rotating elements.

16. The single-wheel driving mechanism according to claim 3, wherein said running wheel is connected with torsional strength with said bevel gear located on a driven side, and wherein said rim of the running wheel is supported versus said pivot via said bearing elements.

17. The single-wheel driving mechanism according to claim 16, further comprising a shaft journal pressed into a passage of said housing.

18. The single-wheel driving mechanism according to claim 17, wherein said shaft journal receives at least one antifriction bearing, on which said rim of said running wheel are supported; and that said bevel gear comprises a pot-shaped attachment molded onto, and forming one piece with said bevel gear, and extending in a direction of said running wheel.

19. The single-wheel driving mechanism according to claim 18, further comprising a pump device integrated in said shaft journal, said pump device being comprised of an axially movable tappet and a pressure chamber comprising an inlet valve and an outlet valve.

20. The single-wheel driving mechanism according claim 19, further comprising a contact pressure exerting disk and a spring, wherein said tappet extends through said contact pressure-exerting disk and engages a groove of said pot-shaped attachment of said bevel gear, wherein said tappet is pressed into said groove by said spring and said groove is arranged in the form of a ring and comprises a wavelike deepening.

21. The single-wheel driving mechanism according to claim 19, further comprising a driving shaft having a bore serving as an oil channel, said bore feeding via said outlet valve into said pressure chamber, whereas said inlet valve is connected with a lower interior space of said gearing.

22. The single-wheel driving mechanism according to claim 21, further comprising a spur gear disposed in said housing and a driving shaft coupled to said spur gear and a bevel pinion coupled to said driving shaft wherein said driving shaft is supported above said spur gear and below said bevel pinion.

23. The single-wheel driving mechanism according to claim 22, wherein said spur gear and said bevel gear pinion are connected with said driving shaft by a pressed fit, and wherein said driving shaft is provided with a bore serving as an oil channel.

24. A single-wheel driving mechanism, for floor transport, vehicles, comprising:
 a gearing housing with at least one gear stage;
 a flanged-on drive motor connected to the housing;
 at least one transmission gear in the form of a bevel gear disposed in said gearing housing forming said at least one gear stage;
 at least one support element in the form of a pivot disposed in said gearing housing;
 at least one bearing element disposed in said housing;
 a driven running wheel directly connected with torsional strength to said transmission gear, said transmission gear being rotatably supported on said support element coaxially disposed on an inner side of said housing; and
 at least one extension attachment which is disposed in said housing and coupled at one end to said bevel gear and extending towards said running wheel, wherein said driven running wheel is coupled to said at least one extension attachment.

25. The single wheel driving mechanism as in claim 3, wherein said pivot is arranged axially in relation to said running wheel, said pivot being formed as a single piece with said gearing housing.

* * * * *